United States Patent
Berger et al.

(10) Patent No.: US 10,476,539 B1
(45) Date of Patent: Nov. 12, 2019

(54) AUTOMATIC GAIN CONTROL ADJUSTMENT IN MULTI-ANTENNA SHORT-RANGE WIRELESS SYSTEM

(71) Applicant: Marvell International Ltd., Hamilton (BM)

(72) Inventors: Christian R. Berger, San Jose, CA (US); Niranjan Grandhe, San Jose, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/046,114

(22) Filed: Jul. 26, 2018

Related U.S. Application Data (60) Provisional application No. 62/559,377, filed on Sep. 15, 2017.

(51) Int. Cl.
| | |
|---|---|
| *H04B 1/16* | (2006.01) |
| *G01S 3/46* | (2006.01) |
| *H04B 7/08* | (2006.01) |
| *H04W 4/80* | (2018.01) |

(52) U.S. Cl.
CPC .............. *H04B 1/16* (2013.01); *G01S 3/46* (2013.01); *H04B 7/0885* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 6,804,521 B2* | 10/2004 | Tong | ................ | H04W 16/28 370/322 |
| 8,064,862 B2* | 11/2011 | Rudberg | ............ | H04B 7/0811 455/257 |
| 2004/0032363 A1* | 2/2004 | Schantz | ................ | G01S 5/14 342/127 |
| 2004/0259511 A1* | 12/2004 | Liu | ................ | H03G 3/3052 455/136 |
| 2005/0096879 A1* | 5/2005 | Waite | ................ | G01V 3/12 702/189 |
| 2005/0185618 A1* | 8/2005 | Friday | ................ | G01S 5/0252 370/331 |
| 2006/0195161 A1* | 8/2006 | Li | ................ | A61N 1/37223 607/60 |
| 2006/0220786 A1* | 10/2006 | Hagl | ................ | B60R 25/24 340/5.61 |

(Continued)

*Primary Examiner* — Cindy Trandai (57) ABSTRACT

Adjusting automatic gain control of a receiver, in a short-range wireless system having a plurality of channels and a plurality of receiving antennas, includes setting initial gain to be set by receiver AGC based on signals received at a receiver reference antenna, receiving, at each of the receiving antennas, a signal on a current channel, and adjusting gain to be set by AGC for the signal to prevent saturation. Angle-of-arrival estimation may be performed following adjusting of the AGC. Adjusting AGC may include backing off the AGC, changing the reference antenna prior to deriving gain to be set by AGC, or determining gain to be set by AGC at additional receiving antennas, and for each antenna that is not the reference antenna and is not one of the additional antennas, selecting gain to be set by AGC from a closest one of the reference antenna and the additional antennas.

21 Claims, 7 Drawing Sheets

(56) References Cited

U.S. PATENT DOCUMENTS

| | | | | |
|---|---|---|---|---|
| 2013/0142294 | A1* | 6/2013 | Morita | H04B 1/16 375/345 |
| 2013/0211740 | A1* | 8/2013 | Ramamurthy | G01L 3/108 702/42 |
| 2014/0009338 | A1* | 1/2014 | Lin | H01Q 3/247 342/374 |
| 2014/0011513 | A1* | 1/2014 | Watts | G01S 5/0252 455/452.2 |
| 2014/0079145 | A1* | 3/2014 | Sampath | H04B 7/0811 375/260 |
| 2016/0190854 | A1* | 6/2016 | Woo | H02J 7/025 320/108 |
| 2016/0380733 | A1* | 12/2016 | Tseng | H04L 5/0048 375/267 |
| 2017/0278061 | A1* | 9/2017 | Skaaksrud | H04L 67/303 |
| 2017/0360317 | A1* | 12/2017 | Zhang | A61B 5/02444 |
| 2018/0031671 | A1* | 2/2018 | Alexander | G01S 5/0273 |
| 2018/0031693 | A1* | 2/2018 | Zielinski | G01S 13/756 |
| 2018/0323834 | A1* | 11/2018 | Jiang | H04B 7/0408 |
| 2018/0351592 | A1* | 12/2018 | Coban | H04B 1/1036 |

* cited by examiner

AUTOMATIC GAIN CONTROL ADJUSTMENT IN MULTI-ANTENNA SHORT-RANGE WIRELESS SYSTEM

CROSS REFERENCE TO RELATED APPLICATION

This claims the benefit of commonly-assigned U.S. Provisional Patent Application No. 62/559,377, filed Sep. 15, 2017, which is hereby incorporated by reference herein in its entirety.

FIELD OF USE

This disclosure relates to adjusting automatic gain control (AGC) in a multi-antenna short-range wireless system (such as the system licensed by the Bluetooth Special Interest Group under the trademark BLUETOOTH®).

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Short-range wireless systems, such as the system licensed by the Bluetooth Special Interest Group under the trademark BLUETOOTH®, have traditionally been single-antenna systems. That is, each node in such a short-range wireless system, whether transmitting or receiving, used a single antenna. More recently, implementations of such a short-range wireless system using multiple antennas have been developed. In such multi-antenna short-range wireless systems, the settled gain resulting from performing automatic gain control (AGC) is applied for signals received at all antennas, but automatic gain control determines that gain based only on signals received at one of the multiple antennas which has been designated as a reference antenna. Because the signal strength at the different antennas may vary, performing AGC for the signals received at all antennas based on the signal received at one antenna can result in saturation or underrun.

SUMMARY

A method according to implementations of the subject matter of this disclosure, for adjusting automatic gain control of a receiver, in a short-range wireless system having a first plurality of channels and a second plurality of receiving antennas, includes allowing the automatic gain control to set an initial gain at the receiver based on signals received at a reference antenna of the receiver, receiving, at each of the second plurality of receiving antennas, a signal on a current channel from among the plurality of channels, and adjusting gain set by the automatic gain control for the signal from the initial gain to a new gain to prevent saturation.

A first implementation of such a method may further include performing an angle-of-arrival estimation operation based on the signal following the adjusting of the gain set by the automatic gain control.

In a second implementation of such a method, the adjusting the gain set by the automatic gain control may include backing off the gain set by the automatic gain control of the receiver.

In a first variant of the second implementation, the adjusting the gain set by the automatic gain control may include adjusting the gain based on conditions related to the current channel.

In that variant, the conditions related to the current channel may include conditions previously measured on the current channel. Alternatively, the conditions related to the current channel comprise conditions previously measured on a channel neighboring the current channel.

In a second variant of the second implementation, the adjusting the gain set by the automatic gain control may include changing the reference antenna prior to deriving the gain set by the automatic gain control.

In that variant, the changing the reference antenna may include determining one of the second plurality of receiving antennas for which received signal strength is highest, and designating that one of the second plurality of receiving antennas for which received signal strength is highest as the reference antenna for the current channel.

Further in that variant, the determining may include comparing received signal strength indices, recorded during a previous channel event on the current channel, for each antenna in the second plurality of receiving antennas.

In addition, the determining may further include taking account of received signal strength indices, recorded during a previous channel event on an adjacent channel, at antennas in the second plurality of receiving antennas.

In a third variant of the second implementation, the adjusting the gain set by the automatic gain control may include determining the gain to be set by automatic gain control at additional ones of the second plurality of receiving antennas, and for each antenna in the second plurality of receiving antennas that is not the reference antenna and is not one of the additional ones of the second plurality of antennas, selecting the gain set by automatic gain control at a closest one of the reference antenna and the additional ones of the second plurality of antennas.

In that variant, the determining the gain to be set by the automatic gain control at additional ones of the second plurality of receiving antennas may include determining the gain to be set by the automatic gain control at ones of the second plurality of receiving antennas that are selected based on recent channel events on adjacent channels.

In that variant, the determining the gain to be set by the automatic gain control at additional ones of the second plurality of receiving antennas may include determining the gain to be set by the automatic gain control at ones of the second plurality of receiving antennas that are spatially dispersed relative to the reference antenna.

In a fourth variant of the second implementation, the adjusting the gain set by the automatic gain control may include, on a per-channel basis, grouping antennas into at least two groups according to received signal strength, assigning respective gain set by automatic gain control to each respective group, and for each respective group, sampling each antenna using the respective gain set by the automatic gain control assigned to the respective group.

That variant may further include, upon switching to each respective group, sampling a first antenna in the respective group twice.

According to implementations of the subject matter of this disclosure, a receiver in a short-range wireless system, having a first plurality of channels includes a second plurality of receiving antennas, wherein one antenna of the second plurality of receiving antennas is a designated as a reference antenna, and control circuitry configured to control gain set by automatic gain control at the receiver to an initial value based on signals received at the reference antenna, receive, from each respective one of the second plurality of receiving antennas, a respective signal on a current channel from among the plurality of channels, and adjust the gain set by the automatic gain control for the signal from the initial gain set by the automatic gain control to prevent saturation.

In a first implementation of the receiver, the control circuitry may further include angle-of-arrival estimation circuitry that determines a direction of an incoming signal.

According to implementations of the subject matter of this disclosure, a short-range wireless system, having a first plurality of channels, includes at least a first node including a transmitter, at least a second node including a receiver, the receiver including a second plurality of receiving antennas, wherein one antenna of the second plurality of receiving antennas is a designated as a reference antenna, and control circuitry configured to control gain set by automatic gain control at the receiver to an initial value based on signals received from the transmitter at the reference antenna, receive, from each respective one of the second plurality of receiving antennas, a respective signal on a current channel from among the plurality of channels, and adjust the gain set by the automatic gain control for the signal from the initial gain set by the automatic gain control to prevent saturation.

In an implementation of such a system, the control circuitry may further include angle-of-arrival estimation circuitry that determines a direction of an incoming signal from the transmitter.

In a variant of that implementation, the at least a first node including a transmitter includes a third plurality of nodes, each respective node in the third plurality of nodes including a respective transmitter, and the angle-of-arrival estimation circuitry separately determines a respective direction of each respective incoming signal from each respective transmitter.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As discussed above, short-range wireless systems, such as the system licensed by the Bluetooth Special Interest Group under the trademark BLUETOOTH®, have traditionally been single-antenna systems. That is, each node in such a short-range wireless system, whether transmitting or receiving, used a single antenna. More recently, implementations of such a short-range wireless system using multiple antennas have been developed.

In one implementation of a multi-antenna short-range wireless system, a receiving node can determine the location of a sending node by, in part, determining the angle of arrival of an incoming signal based on phase differences between the same signal as received at different antennas.

However, typically, received signal strength for the purpose of determining the gain to be set by automatic gain control is measured at only one antenna in the array of receiving antennas. As discussed in more detail below, because of various conditions, such as signals arriving at different antennas having traversed different paths from the transmitting antenna, or signals arriving at different antennas being superpositions of different multipath propagation paths (which can combine constructively or destructively based on their relative phase), the received signal strength at different antennas may differ.

If the received signal strength at a particular antenna is less than the received signal strength at the reference antenna used to determine the gain to be set by the AGC parameters, the AGC as applied to the signal at that particular antenna may be insufficient, resulting in analog-to-digital converter (ADC) underrun. If the received signal strength at a particular antenna is greater than the received signal strength at the reference antenna used to determine the gain to be set by the AGC, the AGC as applied to the signal at that particular antenna may be excessive, resulting in ADC saturation.

ADC saturation will clip the signal strength, making the maximum signal strength appear lower than its true value, and potentially affecting the angle-of-arrival determination by directly affecting phase determinations because of non-linear distortion. And large amplitudes are treated as having a high signal-to-noise ratio, and therefore as being more reliable, so saturated signals are erroneously treated as highly reliable even though they include distorted phase information.

While ADC underrun is more easily accommodated, ADC underrun also can affect the angle-of-arrival determination by, e.g., incurring large quantization noise.

In accordance with implementations of the subject matter of this disclosure, AGC is adjusted adaptively. Various adaptive adjustment techniques may be employed. For example, in one technique, the previously determined amount of AGC can be reduced ("backed off"), as described below, ahead of certain functions or measurements. In a second technique, the reference antenna on which AGC is performed can be changed for different channels using adaptive techniques as discussed below. In a third technique, AGC can be run based on signals received at a plurality of antennas in the array of antennas, with the differing results being applied to groupings of adjacent antennas. In a fourth technique, different AGC settings can be applied to different antennas, possibly in groups, based on received signal strength. The various techniques described herein for adaptively adjusting AGC can be combined, in whole or in part.

Adaptive AGC adjustment in accordance with implementations of the subject matter of this disclosure will now be described in the context of angle-of-arrival measurements in BLUETOOTH® short-range wireless systems. However, it will be appreciated that the techniques described herein apply to adaptive AGC adjustment in other contexts, and in other types of short-range wireless systems, as well.

As noted above, short-range wireless systems, such as BLUETOOTH® short-range wireless systems, have traditionally been single-antenna systems. That is, each node in such a short-range wireless system, whether transmitting or receiving, used a single antenna. More recently, implementations of such a short-range wireless system using multiple antennas have been developed.

In one implementation of a multi-antenna short-range wireless system, a receiving node can determine the location of a sending node by, in part, determining the angle of arrival of an incoming signal based on phase differences between the same signal as received at different antennas, resulting from the different times-of-flight required to reach the different antennas.

Figure 1:
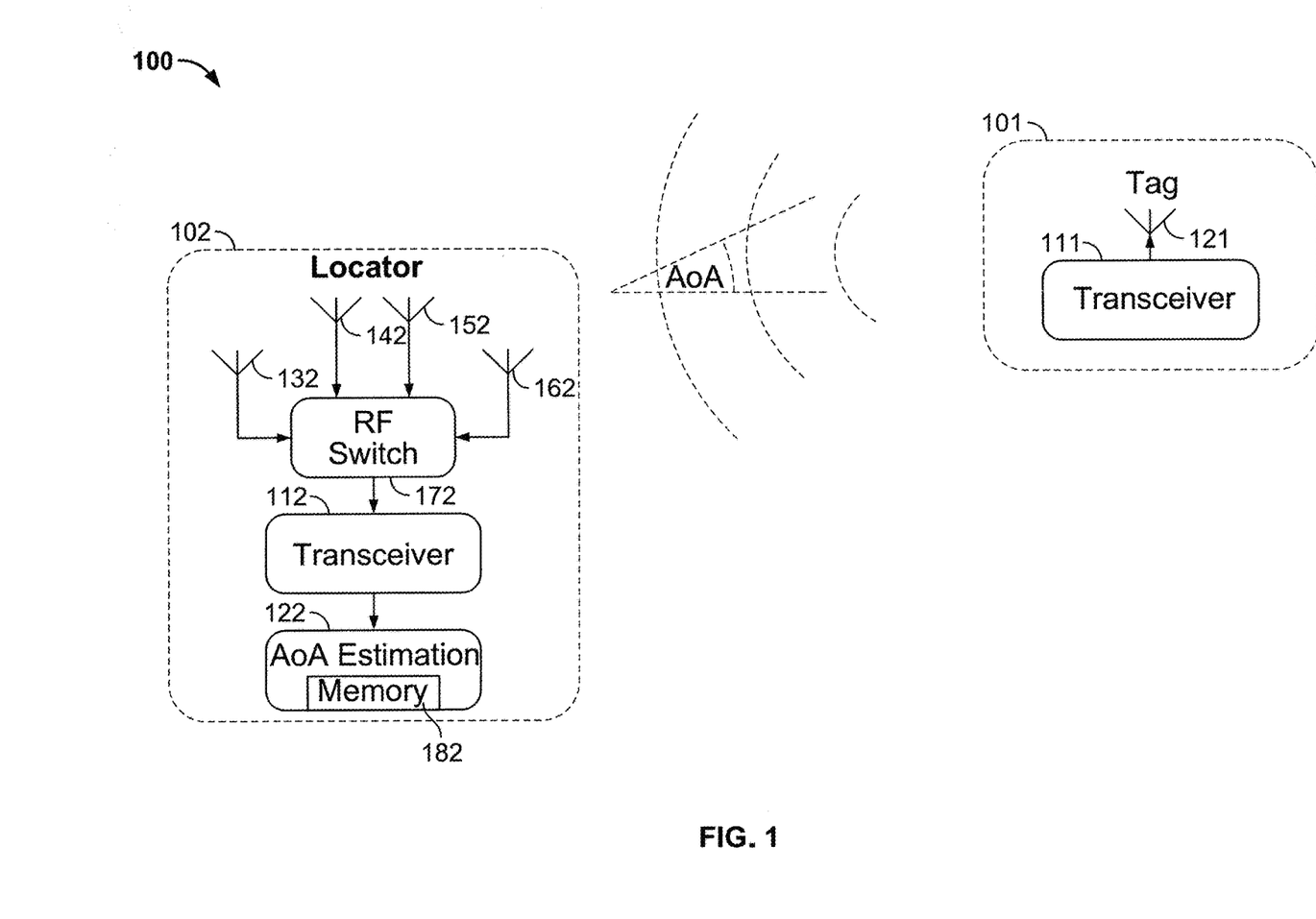
FIG. 1 shows an example of two nodes of a multi-antenna short-range wireless system in which implementations of the subject matter of this disclosure may be used.

An example of two nodes of a multi-antenna short-range wireless system 100 is shown in FIG. 1. Node 101 is a single-antenna "tag," while node 102 is multi-antenna "locator" that can identify the direction to a tag, such as node 101, by determining the angle-of-arrival ("AoA") of a signal from node 101.

Node 101 includes a transceiver 111 and one antenna 121.

Node 102 includes a transceiver 112 and an AoA estimation engine 122, which may include memory 182, as well as a microprocessor, hard-wired circuitry, or configurable circuitry such as a field-programmable gate array, configured to perform the operations described below. Node 102 also includes four antennas 132, 142, 152, 162, and an RF switch 172 that connects antennas 132, 142, 152, 162 to transceiver 112. RF switch 172 switches from one of antennas 132, 142, 152, 162 to another in the range of a fraction of a microsecond to a small number of microseconds (up to about 4 µs).

For a path-length difference, x, from antenna 121 to two different ones of antennas 132, 142, 152, 162, the difference in the time-of-flight is $\Delta t = x/c$, where c is the speed of light. The phase difference $\Delta\varphi$ can then be derived as $\Delta\varphi = 2\pi(\Delta t/T) = 2\pi f \Delta t$, where T is the period (1/f) of a signal of frequency f.

Figure 2:
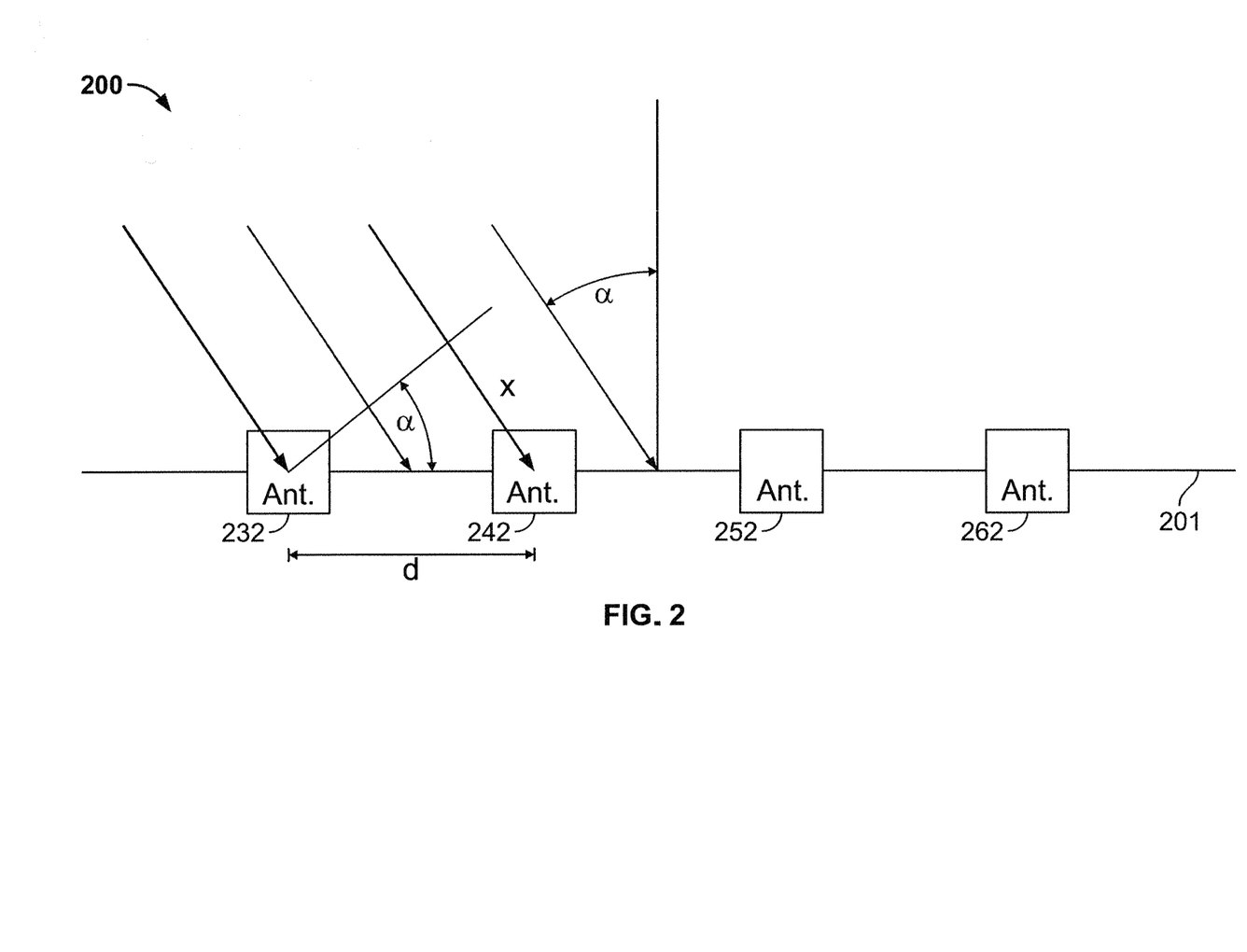
FIG. 2 shows portions of a multi-antenna short-range wireless system in which implementations of the subject matter of this disclosure may be used.

For ease of calculation, one can consider the system 200 of FIG. 2 where four antennas 232, 242, 252, 262 are arranged in a straight line 201 as a uniform linear array (ULA), and the tag to be located is far enough away that the paths traveled by the incoming signals arriving at each one of antennas 232, 242, 252, 262 can be considered to be parallel. If the AoA is $\alpha$, and the distance between each pair of adjacent ones of antennas 232, 242, 252, 262 is d, then the difference x in path length from antenna 121 to two adjacent ones of antennas 232, 242, 252, 262 is $x = d \sin \alpha$.

Substituting in the relationships set forth above:

$\Delta\varphi = 2\pi(\Delta t/T)$ or $2\pi f \Delta t$ $\Delta t = x/c$ $x = d \sin \alpha$ $\Delta\varphi = 2\pi(d \sin \alpha/Tc)$ or $2\pi f d \sin \alpha/c$ $\alpha = \arcsin(Tc\Delta\varphi/2\pi d)$ or $\arcsin(c\Delta\varphi/2\pi f d)$ T (or f) and d are known. Therefore, measuring $\Delta\varphi$ yields $\alpha$.

Figure 3:
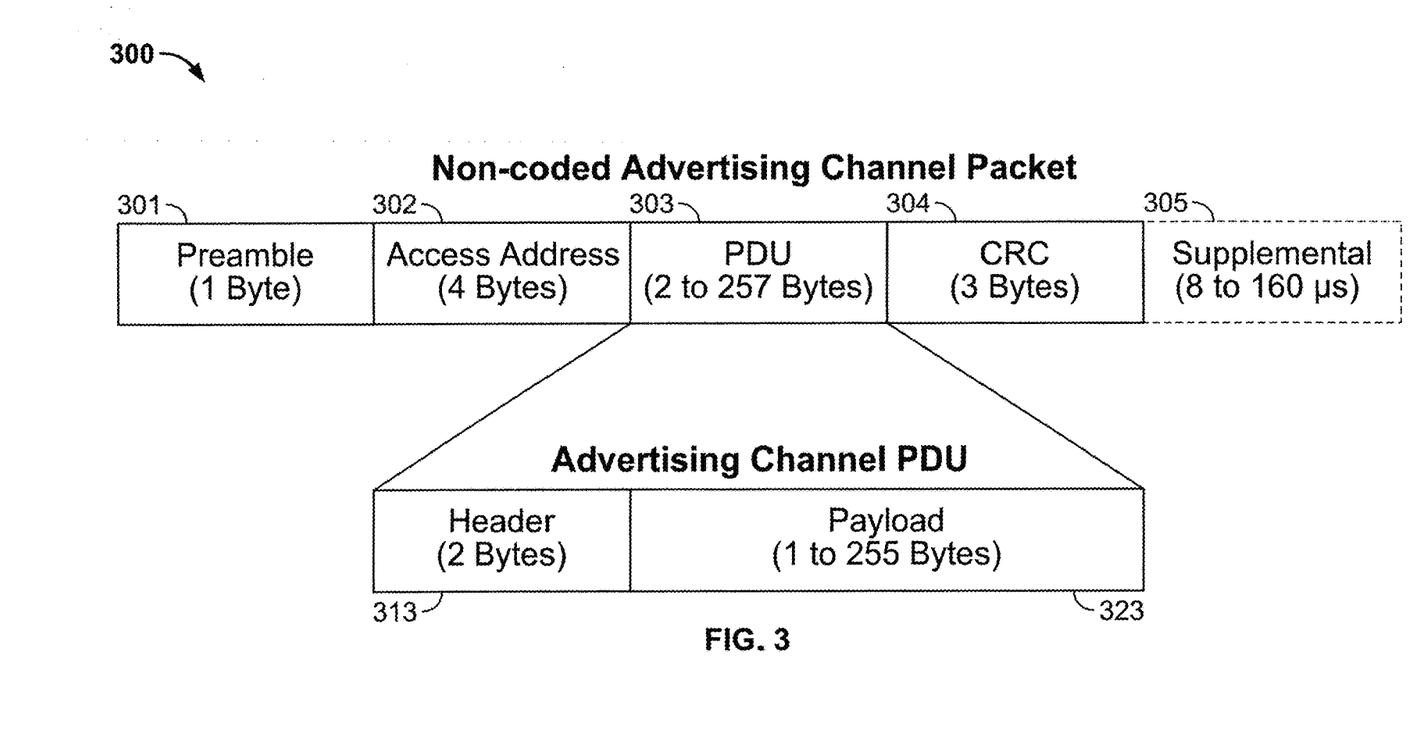
FIG. 3 is a diagram of a non-coded advertising channel packet in a multi-antenna short-range wireless system in which implementations of the subject matter of this disclosure may be used.

Current versions of the BLUETOOTH® short-range wireless standard accommodate AoA measurements. A non-coded advertising channel packet 300 that accommodates AoA measurements is shown in FIG. 3. Following a preamble 301, an access address 302, a protocol data unit 303 (including header 313 and data payload 323), and a cyclic redundancy check field 304, there is a "supplemental" field 305 having a duration between about 8 µs and about 160 µs during which samples can be taken for AoA measurements by, e.g., four or eight or sixteen antennas. If the nominal sampling time is every 2 µs, requiring RF switch 172 to finish switching and settle into a new state within 1 µs, such as in switch slot 1 (423), leaving 1 µs to sample the signal, such as in sample slot 1 (413), about 80 samples can be taken. Using a slower RF switch 172, that finishes switching and settles into a new state within 3 µs, for a total nominal sampling time of 4 µs, can generate up to about 40 samples.

Figure 4:
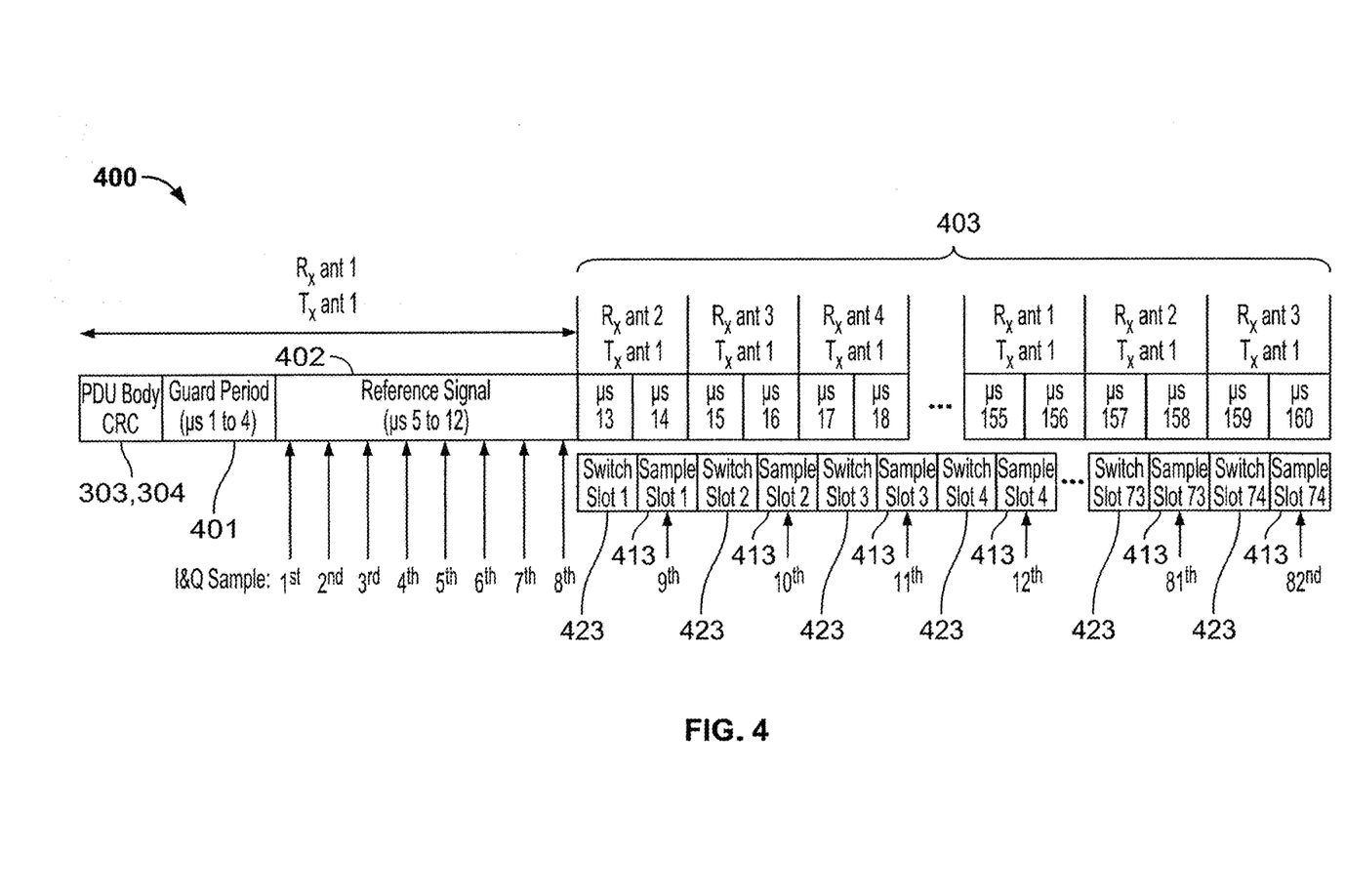
FIG. 4 is a diagram of a supplemental field of a non-coded advertising channel packet as in FIG. 3.

The structure of an example 400 of a supplemental field 305 is shown in FIG. 4. The timing of the antenna switching for the various antennas that receive this signal also is shown (all transmission events are on TX ant 1, while reception events rotate among Rx ant 1, Rx ant 2, Rx ant 3 and Rx ant 4). This example assumes a frequency of 1 MHz, so that each slot in supplemental field 400 is 1 µs in duration. Supplemental field 400 begins with a guard band 401 of 4 µs in duration (4 slots, 1-4), followed by a reference interval 402 of 8 µs in duration (8 slots, 5-12). However, the entire supplemental field 400 may be only 8 µs in duration, so the reference interval 402 may be only 4 µs in duration, which would end the supplemental field 400.

Assuming that supplemental field 400 is longer than 8 µs in duration as shown in FIG. 4, the remainder 403 of supplemental field 400 includes up to 148 additional 1 µs slots. Further assuming that RF switch 172 switches within 1 µs, that allows for up to 74 samples that may be taken, because every 1 µs slot in which a sample can be taken (sample slot 413) would be preceded by a 1 µs slot during which RF switch 172 switches (switch slot 423). In this example, there is one remote transmit antenna 121 (identified in FIG. 4 as Tx ant 1), and four local receive antennas 232, 242, 252, 262 (identified in FIG. 4 as Rx ant 1, Rx ant 2, Rx ant 3, and Rx ant 4). The antenna switching sequence for this example is shown above the time slots in FIG. 4 (all transmission events are on TX ant 1, while reception events rotate among Rx ant 1, Rx ant 2, Rx ant 3 and Rx ant 4).

As noted above, the phase difference measurements derived from the samples taken from supplemental field 400 to determine angle-of-arrival may be affected by signal strength differences at the different receiving antennas 232, 242, 252, 262, which result not only from the different locations of receiving antennas 232, 242, 252, 262, but also from the different paths that signals may take between transmit antenna 121 and receiving antennas 232, 242, 252, 262 in a multi-path system, resulting in superpositions of different multipath propagation paths which can combine constructively or destructively based on their relative phase.

AGC may be used to attempt to equalize the signal strength. However, it is not possible for AGC to be applied to each sample at each antenna for every packet, because the settling time of AGC circuitry is finite. In previously known systems, AGC may be applied during preamble 301, based only on a single reference antenna, which nominally is antenna 232 (Rx ant 1). As noted above, this may result in ADC saturation for some samples at some antennas, and ADC underrun for other samples at other antennas.

Because ADC saturation is a more serious concern than ADC underrun in determining angle-of-arrival, one known approach has been to apply a constant AGC back-off during AoA measurements. The amount of back-off may have been determined on a per-channel basis to avoid saturation at the antenna with the highest received signal strength index among all antennas. A typical back-off value may have been −3 dB.

However, each per-channel determination would have been based on a previous event in that channel. In a BLUETOOTH® short-range wireless system, one or more packets can arrive on one channel during every "connection event"—typically on the order of 7.5-35 ms (but theoretically up to 4 s), and there are 37 channels. Moreover, to allow for user data traffic, AoA measurements are not taken on every event in a channel. Typically, 2-8 events are skipped in periodic fashion. Therefore, e.g., if the interval between connection events is 20 ms, and four connection events are skipped between AoA measurements, it would take 3.7 s to return to the same channel. By then, the signal strength measurement previously taken on that channel may no longer be accurate.

In accordance with implementations of the subject matter of this disclosure, a number of possible techniques are available to adjust AGC for AoA measurements.

According to one technique, an AGC back-off amount is applied to a channel or group of channels. To avoid the limitations described above, the back-off amount can be determined from conditions on several channels, which may be averaged in some implementations. In particular, if a neighboring channel has been measured recently, information from that neighboring channel may be factored in to the AGC back-off determination for a current channel.

According to another technique, instead of using the same reference antenna for every channel, the reference antenna is changed adaptively for each channel based on received signal strength. On any event in a channel, the received signal strength at each antenna may be measured, and the antenna with the highest received signal strength may be noted. During the next AoA determination on that channel, that antenna with the highest previously recorded received signal strength will be used as the reference antenna, with AGC determined based on that received signal strength, thereby minimizing or avoiding ADC saturation. In a variant of this technique, the reference antenna designation may be modified based on information from neighboring channels obtained subsequent to the previous measurement on the current channel.

According to a third technique, AGC is performed separately for multiple antennas. While ideally AGC should be performed for all antennas, that is not normally feasible, as there may be as many as sixteen antennas, and only the 8 µs duration of reference interval 402 is available for AGC. This allows performance of AGC on one or two additional antennas, for a total of two or three antennas. The additional antennas can be chosen based on previous measurements indicating which antennas have the highest received signal strength (and therefore are most in need of adjustments to prevent saturation). Alternatively, the antennas on which AGC is performed can be spread substantially spatially uniformly across the array of antennas.

According to a fourth technique, different AGC gain levels are applied to different antennas. As noted above, ideally AGC should be performed for all antennas, but that is not normally feasible. Here, two (or more) gain levels are decided in advance and each antenna in the array of antennas is assigned to one of those levels. For example, the antennas can be divided into groups based on received signal strength. Each group would include antennas having similar received signal strength. The number of groups should be kept small because of the settling time required each time the AGC level is adjusted for a different group. In addition, because of the settling time required to switch AGC levels, the first antenna in each group may be sampled twice, because the first sample may be inaccurate as a result of the AGC settling; that sample can be discarded.

Figure 5:
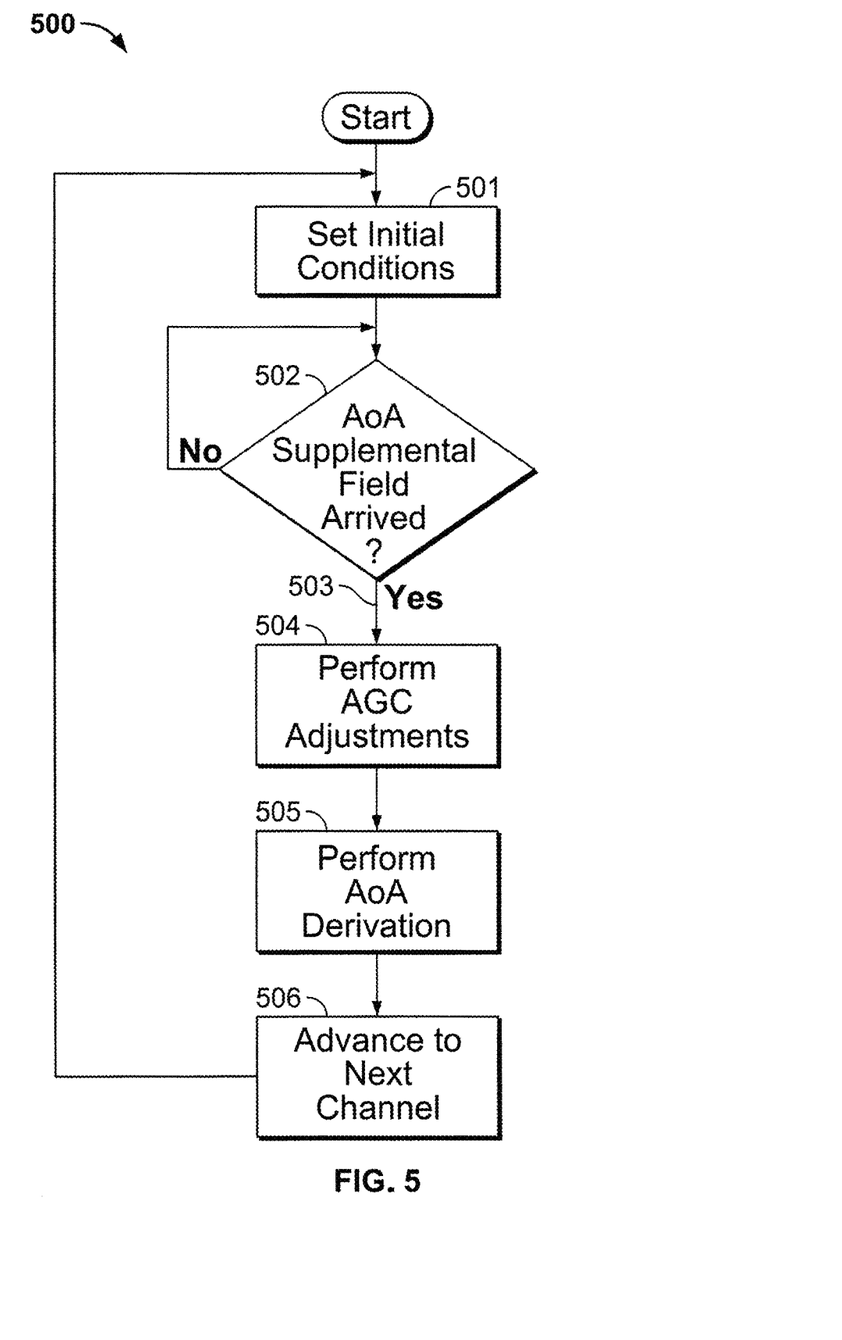
FIG. 5 is a flow diagram of the operation of implementations of the subject matter of this disclosure.

An example of a method 500 according to implementations of the subject matter of this disclosure for adjusting AGC for AoA processing is diagrammed in FIG. 5. At 501, initial conditions (such as reference antenna, default back-off amount, etc.) are set. At 502, arrival of a supplemental field for AoA is awaited. On arrival at 503 of a supplemental field for AoA, AGC adjustments are performed at 504 for the current channel. At 505, AoA derivation is performed based on the signals received following AGC adjustments 504. At 506, flow advances to the next channel and returns to 501.

Figure 6:
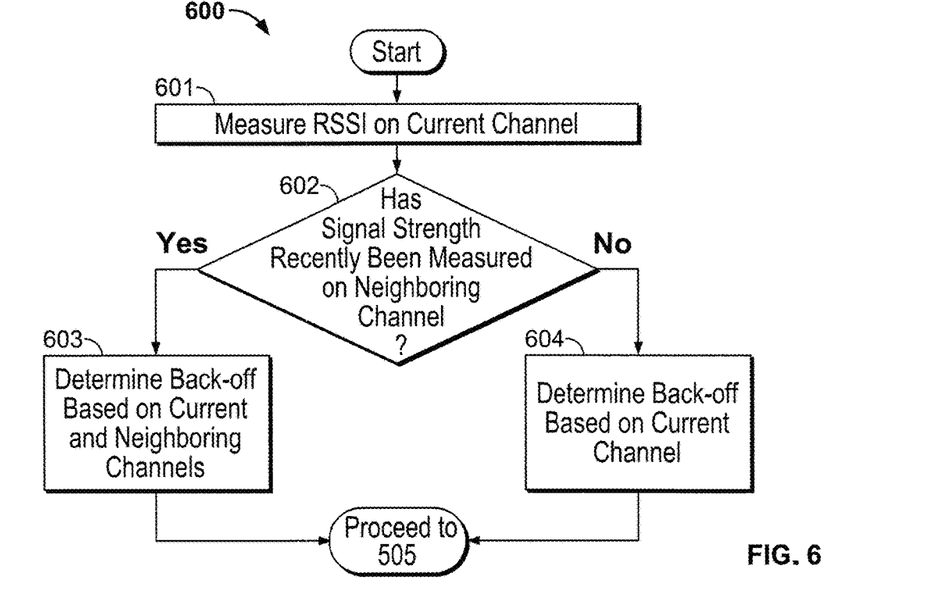
FIG. 6 is a flow diagram of one implementation of a portion of the flow diagram of FIG. 5.

One implementation 600 of AGC adjustments 504 is diagrammed in FIG. 6. At 601, the received signal strength of the current channel is measured. At 602, it is determined if the received signal strength of any neighboring channel or channels has been measured recently. Although directly neighboring channels are best, channels that are further away can be included by interpolating multiple neighboring channels or estimating a frequency correlation that measures the level of change on a given antenna across channels. Similarly, measurement of the neighboring channel or channels in the immediately preceding measurement interval is best.

If at 602 it is determined that the received signal strength of a neighboring channel or channels has been measured recently, then at 603, an amount of AGC back-off is determined based on the received signal strength of the current channel and the neighboring channel or channels, and flow continues to 505 for AoA derivation. One approach, suitable with a small number (e.g., four) of antennas, is to back off sufficiently to avoid saturation on even the strongest antenna. If there are more antennas (e.g., eight or more), saturation may be permitted on one antenna to avoid ADC underrun on other antennas, but in such a case, the saturated antenna should be noted so that its samples can be ignored.

If at 602, it is determined that the received signal strength of a neighboring channel has not been measured recently, then at 604, an amount of AGC back-off is determined based on the received signal strength of the current channel, possibly including some averaging of signal strength measurements that are adjacent in time (e.g., same channel, previous packet) or in frequency (e.g., neighboring channel, more recently measured), and flow continues to 505.

Figure 7:
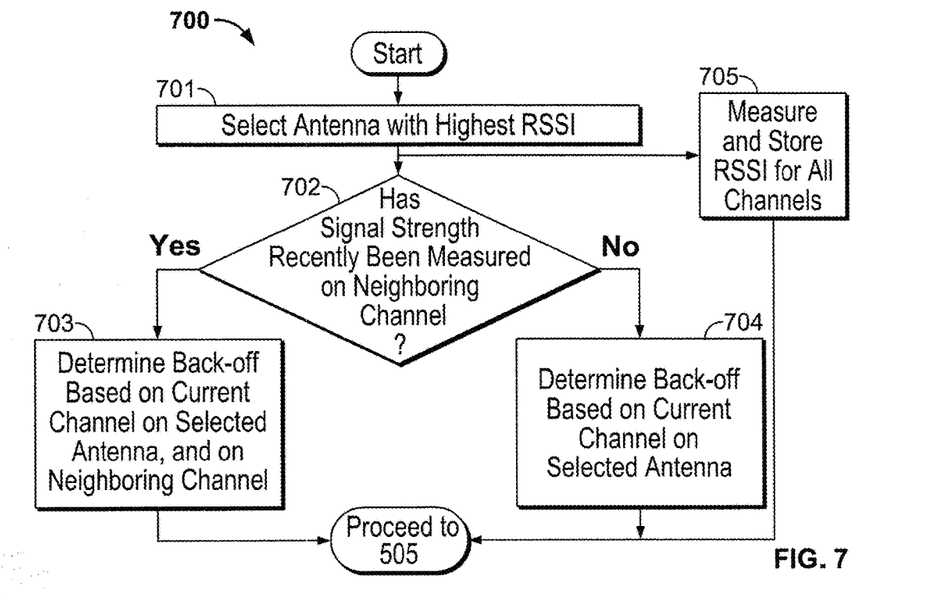
FIG. 7 is a flow diagram of a second implementation of a portion of the flow diagram of FIG. 5.

A second implementation 700 of AGC adjustments 504 is diagrammed in FIG. 7. At 701, the antenna with the highest received signal strength indicator (RSSI) is selected from a record of RSSI measurements by antenna. At 702, it is determined if the received signal strength of any neighboring channel or channels has been measured recently (as explained above in connection with FIG. 6). If so, then at 703, an amount of AGC back-off is determined based on the received signal strength of the current channel on the selected antenna, rather than on a default reference antenna, and the neighboring channel or channels (as explained above in connection with FIG. 6), and flow continues to 505 for AoA derivation. If at 702, it is determined that the received signal strength of a neighboring channel has not been measured recently, then at 704, an amount of AGC back-off is determined based on the received signal strength of the current channel on the selected antenna, rather than on a default reference antenna, without regard to neighboring channels, and flow continues to 505 for AoA derivation. At 705, in parallel with 702-704, RSSI is measured for all antennas and stored so that more current RSSI data is available to select the antenna on the next pass.

Figure 8:
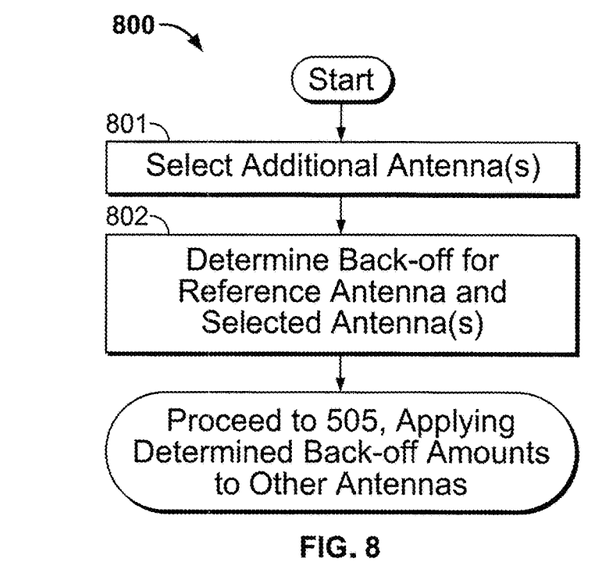
FIG. 8 is a flow diagram of a third implementation of a portion of the flow diagram of FIG. 5.

A third implementation 800 of AGC adjustments 504 is diagrammed in FIG. 8. At 801, one or two antennas in addition to the reference antenna are selected out of the full array of antennas, which may include up to sixteen antennas. The selection could be based on recent measurements for adjacent channels, to select those antennas with higher RSSI values, or the selection could be made to achieve spatial diversity (e.g., a uniform spatial distribution of antennas). At 802, AGC back-off determinations are performed for the reference antenna and each of the antennas selected at 801. Flow then continues to 505, where during AoA derivation the determined AGC back-off values are applied to the selected antennas. The determined AGC back-off values also are applied to other antennas; for example, each other antenna could be backed off by the back-off amount determined for the closest antenna for which a back-off amount was determined.

Figure 9:
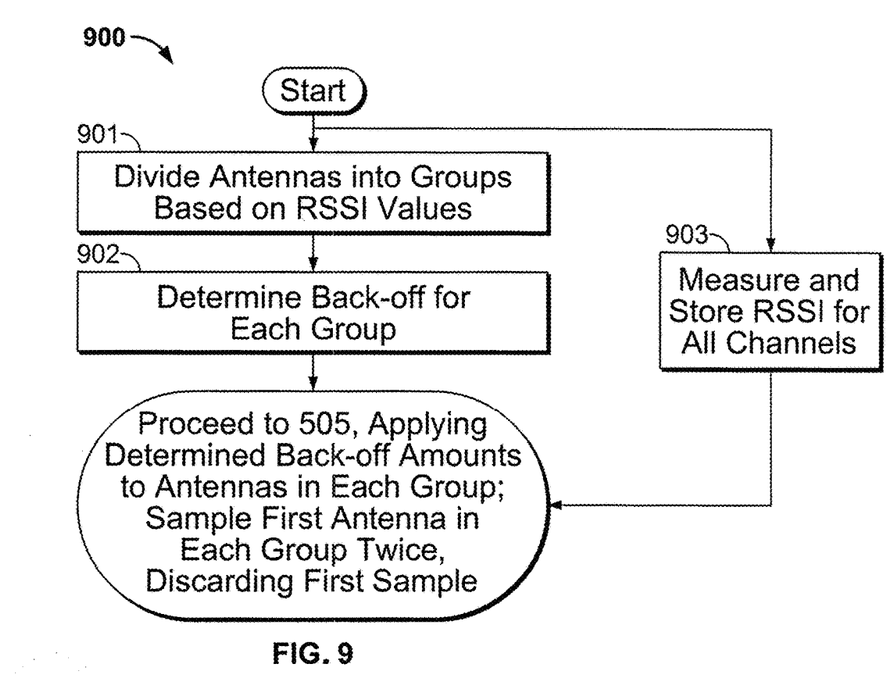
FIG. 9 is a flow diagram of a fourth implementation of a portion of the flow diagram of FIG. 5.

A fourth implementation 900 of AGC adjustments 504 is diagrammed in FIG. 9. At 901, the antennas are divided into two (or possibly three) groups based on similarities of RSSI values. At 902, a back-off amount is determined (as explained above in connection with FIG. 6) for each group based on RSSI values measured during a previous pass previously. Flow then continues to 505 where during AoA derivation the determined AGC back-off values are applied to the selected groups of antennas. Within each group, the first antenna is sampled twice, with the first sample being discarded, so that the newly-applied AGC back-off value for that group has time to settle. At 903, in parallel with 901-902, RSSI is measured for all antennas and stored so that more current RSSI data is available to calculate the different back-off amounts on the next pass.

As noted above, the operations described above for adjusting AGC at antennas of a short-range wireless system, and thereby improving AoA determinations, may be performed in AoA estimation engine 122, which may include memory 182, as well as a microprocessor, hard-wired circuitry, or configurable circuitry such as a field-programmable gate array (not explicitly shown), configured to perform the operations described.

Thus it is seen that methods and apparatus for automatic gain control adjustment in a multi-antenna short-range wireless system, which, among other things, improves angle-of-arrival determinations, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for adjusting automatic gain control of a receiver in a short-range wireless system having a first plurality of channels and a second plurality of receiving antennas, the method comprising:
    allowing the automatic gain control to set an initial gain at the receiver based on signals received at a reference antenna of the receiver;
    receiving, at each of the second plurality of receiving antennas, a signal on a current channel from among the plurality of channels; and
    adjusting the gain set by the automatic gain control for the signal from the initial gain to a new gain to prevent saturation; wherein the adjusting gain set by the automatic gain control comprises, on a per-channel basis:
        assigning each antenna in the second plurality of antennas to one of at least two groups according to received signal strength at that antenna;
        assigning respective gain set by automatic gain control to each group; and
        for each respective group, sampling each antenna in that group using the respective gain that was assigned to that group.

2. The method of claim 1 further comprising performing an angle-of-arrival estimation operation based on the signal following the adjusting of the gain set by the automatic gain control.

3. The method of claim 1 wherein the adjusting the automatic gain control comprises backing off the automatic gain control of the receiver.

4. The method of claim 3 wherein the adjusting the gain set by the automatic gain control comprises adjusting the gain set by the automatic gain control based on conditions related to the current channel.

5. The method of claim 4 wherein the conditions related to the current channel comprise conditions previously measured on the current channel.

6. The method of claim 4 wherein the conditions related to the current channel comprise conditions previously measured on a channel neighboring the current channel.

7. The method of claim 3 wherein the adjusting the automatic gain control comprises changing the reference antenna prior to deriving the gain set by the automatic gain control.

8. The method of claim 7 wherein the changing the reference antenna comprises:
    determining one of the second plurality of receiving antennas for which received signal strength is highest; and
    designating that one of the second plurality of receiving antennas for which received signal strength is highest as the reference antenna for the current channel.

9. The method of claim 8 wherein the determining comprises comparing received signal strength indices, recorded during a previous channel event on the current channel, for each antenna in the second plurality of receiving antennas.

10. The method of claim 9 wherein the determining further comprises taking account of received signal strength indices, recorded during a previous channel event on an adjacent channel, at antennas in the second plurality of receiving antennas.

11. The method of claim 1 further comprising, upon switching to each respective group for sampling each antenna in that group, sampling a first antenna in the respective group twice.

12. A method for adjusting the automatic gain control of a receiver in a short-range wireless system having a first plurality of channels and a second plurality of receiving antennas, the method comprising:
    allowing the automatic gain control to set an initial gain at the receiver based on signals received at a reference antenna of the receiver;
    determining respective gain to be set by automatic gain control at respective additional ones of the second plurality of receiving antennas other than the reference antenna;
    for each remaining antenna in the second plurality of receiving antennas:
        identifying a closest antenna from among the group consisting of (1) the reference antenna, and (2) the respective additional ones of the second plurality of antennas, and selecting the respective gain set by automatic gain control from the closest.

13. The method of claim 12 wherein the respective additional ones of the second plurality of receiving antennas are selected based on recent channel events on channels adjacent to a current channel of the first plurality of channels.

14. The method of claim 12 wherein the respective additional ones of the second plurality of receiving antennas are selected based on spatial dispersion relative to the reference antenna.

15. The method of claim 12 wherein the adjusting the automatic gain control comprises backing off the automatic gain control of the receiver.

16. The method of claim 15 wherein the adjusting the gain set by the automatic gain control comprises adjusting the gain set by the automatic gain control based on conditions related to the current channel.

17. A receiver in a short-range wireless system having a first plurality of channels, the receiver comprising:
- a second plurality of receiving antennas, wherein one antenna of the second plurality of receiving antennas is a designated as a reference antenna; and
- control circuitry configured to:
- control gain to be set by automatic gain control at the receiver to an initial value based on signals received at the reference antenna,
- receive, from each respective one of the second plurality of receiving antennas, a respective signal on a current channel from among the plurality of channels, and
- adjust the gain set by the automatic gain control for the signal from the initial value to prevent saturation by, on a per-channel basis:
- assigning each antenna in the second plurality of antennas to one of at least two groups according to received signal strength at that antenna;
- assigning respective gain set by automatic gain control to each group; and
- for each respective group, sampling each antenna in that group using the respective gain that was set by the automatic gain control and assigned to that group.

18. The receiver of claim 17 wherein the control circuitry further includes angle-of-arrival estimation circuitry that determines a direction of an incoming signal.

19. A short-range wireless system having a first plurality of channels, the system comprising:
- at least a first node including a transmitter;
- at least a second node including a receiver, the receiver including:
- a second plurality of receiving antennas, wherein one antenna of the second plurality of receiving antennas is a designated as a reference antenna, and
- control circuitry configured to:
- control gain to be set by automatic gain control at the receiver to an initial value based on signals received from the transmitter at the reference antenna,
- receive, from each respective one of the second plurality of receiving antennas, a respective signal on a current channel from among the plurality of channels, and
- adjust the gain set by the automatic gain control for the signal from the initial value to prevent saturation by, on a per-channel basis:
- assigning each antenna in the second plurality of antennas to one of at least two groups according to received signal strength at that antenna;
- assigning respective gain set by automatic gain control to each group; and
- for each respective group, sampling each antenna in that group using the respective gain that was set by the automatic gain control and assigned to that group.

20. The short-range wireless system of claim 19 wherein the control circuitry further includes angle-of-arrival estimation circuitry that determines a direction of an incoming signal from the transmitter.

21. The short-range wireless system of claim 19 wherein:
- the at least a first node including a transmitter comprises a third plurality of nodes, each respective node in the third plurality of nodes including a respective transmitter; and
- the angle-of-arrival estimation circuitry separately determines a respective direction of each respective incoming signal from each respective transmitter.

* * * * *